United States Patent [19]

Keller et al.

[11] 4,078,899
[45] Mar. 14, 1978

[54] REACTION VESSEL HEATED BY HELIUM

[75] Inventors: Heinz-Jochen Keller, Dortmund-Wellinghofen; Hans-Dieter Marsch; Herbert Biskup, both of Dortmund, all of Germany

[73] Assignee: Friedrich Uhde GmbH, Dortmund, Germany

[21] Appl. No.: 724,633

[22] Filed: Sep. 20, 1976

[30] Foreign Application Priority Data

Sep. 26, 1975 Germany .............................. 2542918

[51] Int. Cl.² ............................ B01J 8/06; G21C 9/00
[52] U.S. Cl. ............................... 23/288 M; 23/289; 23/288 L; 165/142; 176/39; 48/196 A
[58] Field of Search ................ 23/288 M, 289, 288 L; 165/142

[56] References Cited

U.S. PATENT DOCUMENTS

| | | | |
|---|---|---|---|
| 1,286,135 | 11/1918 | Somermeie | 23/289 X |
| 3,899,420 | 8/1975 | Nozawa et al. | 23/288 M X |
| 3,972,688 | 8/1976 | Cornelius et al. | 23/288 M X |

Primary Examiner—James H. Tayman, Jr.
Attorney, Agent, or Firm—Malcolm W. Fraser

[57] ABSTRACT

A reaction vessel for heating by helium under pressure comprising an upright container provided with an upper part and with a lower part constituting a heating space. In the lower container part are vertically spaced inlet and outlet openings for heated helium under pressure. The upper container part has spaced walls providing a space therebetween and two covers. The upper end of the lower container part is closed and catalyst-filled reaction tubes pass through such closure into the heating space. Inlet and outlet pipes for the reaction tubes extend in coaxial manner from the reaction tubes head through the inner wall of the upper reactor part below the cover of such inner wall, and thence through the space between the inner and outer walls and finally to the outside through the outer wall of the upper part below the cover for the outer wall. The length of the inlet and outlet pipes inside the space is more than the distance of the walls, and the coaxial pipes may be disposed in serpentine fashion.

2 Claims, 2 Drawing Figures

REACTION VESSEL HEATED BY HELIUM

BACKGROUND OF THE INVENTION

The present invention relates to a reaction vessel heated by helium under pressure, with reaction tubes filled with catalyst arranged within the vessel, the inlet and outlet pipes for feedstock and product being connected to the reaction tube head. Such reaction vessels with reaction tubes filled with catalyst are used for the steam reforming of hydrocarbons in an endothermic reaction. The heat required for the reaction is provided by helium heated to a high temperature outside of the reaction vessel, e.g. in a nuclear reactor. For reasons of safety, the reaction vessels, which are usually several in number, are arranged radially about the nuclear reactor and mounted in pre-stressed concrete together with the nuclear reactor. The reaction vessels are thus perpendicular to the outer surface of the concrete block and only accessible from above through the covers.

In such reaction vessel, it is necessary to provide separate inlet and outlet pipes for the feedstock and the product for each reaction tube in a reaction vessel so that in case of damage to any reaction tube, such tube can be isolated by blocking off the inlet and outlet pipes outside the reaction vessel, thus obviating the need to shut down the reaction vessel or the entire installation.

It is known to pass the individual inlet and outlet pipes either separately or in groups through the cover of the reaction vessel in order to meet the above requirement. A large number of design problems arise however, since over 100 reaction tubes are arranged in such a reaction vessel and the gas temperatures of the feedstock and the product range from about 600° K to 1100° K.

Thus, it has already been proposed to reduce the product gas temperature by passing the product from the bottom of the reaction tube back to the top of the tube via a helical tube installed within the reaction tube during which process the product undergoes a reduction of temperature by heat exchange against the inflowing feedstock, i.e. hydrocarbons or the reacting gas mixture. In this manner one succeeds in reducing the temperature of the product gas to about 880° K before it reaches the outlet pipe. A temperature of about 880° K is, however, still very high, the design temperature of the cover thus being unfavorably high also and giving rise to unpredictable thermal and mechanical stresses in the cover during start-up and operation. In addition, further unfavorable conditions arise, such as a structural weakening of the cover brought about by the passage of numerous pipes, as well as difficulties in assembly, dismantling and accessibility. If two reaction vessel covers are necessary for reasons of safety, then the above-mentioned disadvantages are even more evident.

SUMMARY OF THE INVENTION

The object of this invention is to avoid the disadvantages described and to find an advantageous solution to the problem of the passage of the inlet and outlet pipes into the reaction vessel for heating with helium.

The invention solves this problem by a combination of the following features:

The upper part of the reaction vessel is equipped with a double wall, thus creating an annular space; the reaction vessel is sealed by two covers, through which no pipes are passed, and each of the covers rests upon a vessel flange; the reaction tube inlet and outlet pipes pass from the inside of the vessel through its inner wall below the inner cover into the annular space; from there the pipes pass through the outer wall below the outer cover.

In a further embodiment of this invention, the inlet and outlet pipes are coaxial, that is, the outlet pipe is within the inlet pipe.

It is an essential feature of this invention that the reaction tubes filled with catalyst are arranged in the reaction vessel in a manner that they can be drawn out individually, that the individual inlet and outlet pipes remain fixed in the reaction vessel and that the covers are not weakened by the passage of any pipes.

The arrangement according to this invention has the advantage, when compared with other known arrangements, that the covers still have dimensions and weights that permit uncomplicated manufacture and easy manipulation, even when the reaction vessel has a diameter of about 3m or more and is designed for the usual operating pressure. Since no pipes have to pass through the cover, it is quite simple to provide it with an unbroken heat insulation. Defective reaction tubes can be replaced easily by cutting or welding, respectively, the inner connecting pipes. No stuffing box packings are necessary for the passage of pipes.

In a further embodiment of this invention, the inlet and outlet pipes are coaxial, a distinct advantage being that the number of pipe passages through the vessel walls is reduced by half and that the structural weakening of the vessel walls is lessened.

The use of coaxial inlet and outlet pipes reduces the inside temperature of pipes passing through the vessel walls to only about 700° K.

BRIEF DESCRIPTION OF THE DRAWING

An example of the invention is illustrated by the drawings and is described in detail below:

FIG. I is a simplified diagrammatic view of the reaction vessel in vertical cross section.

Figure 1:
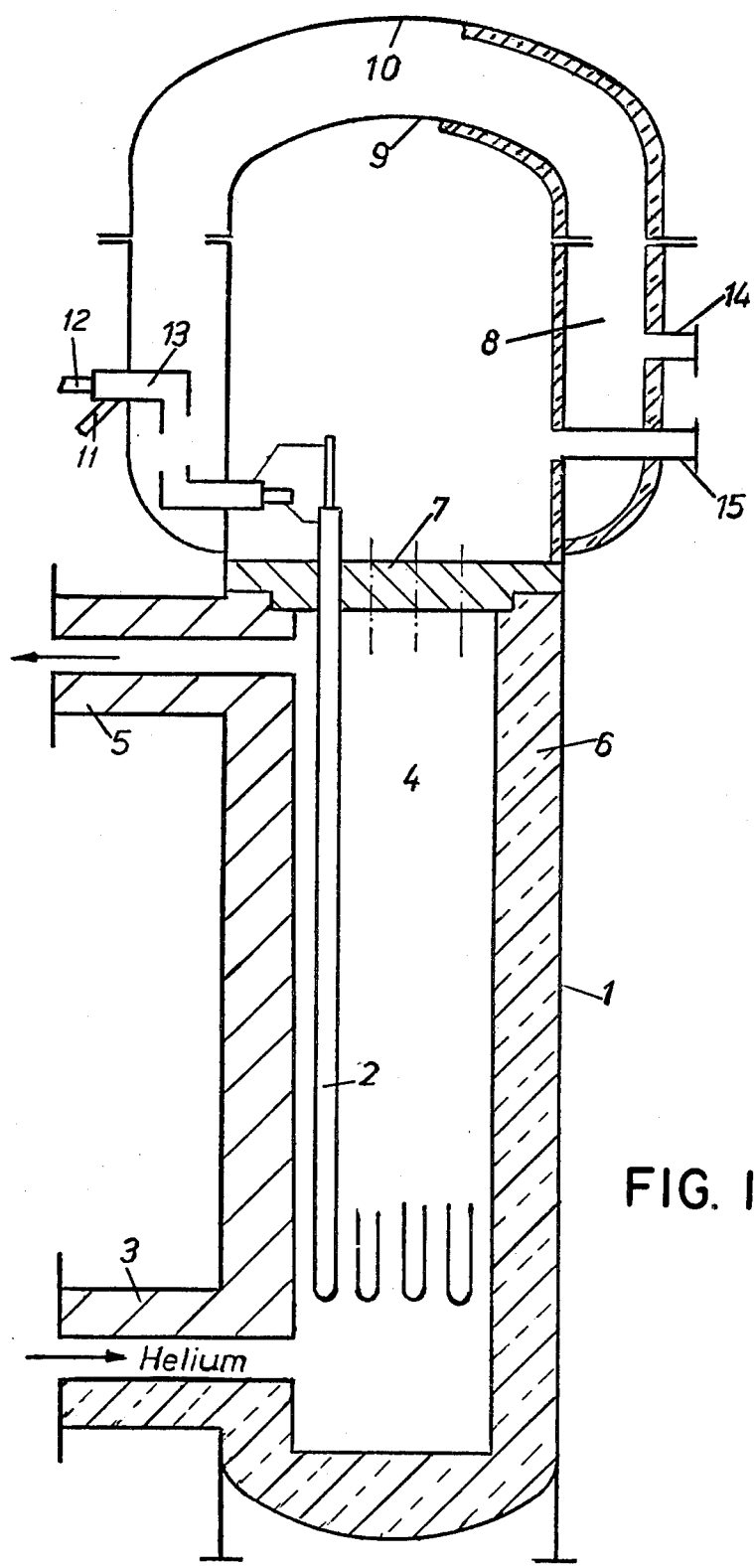
Figure 2:
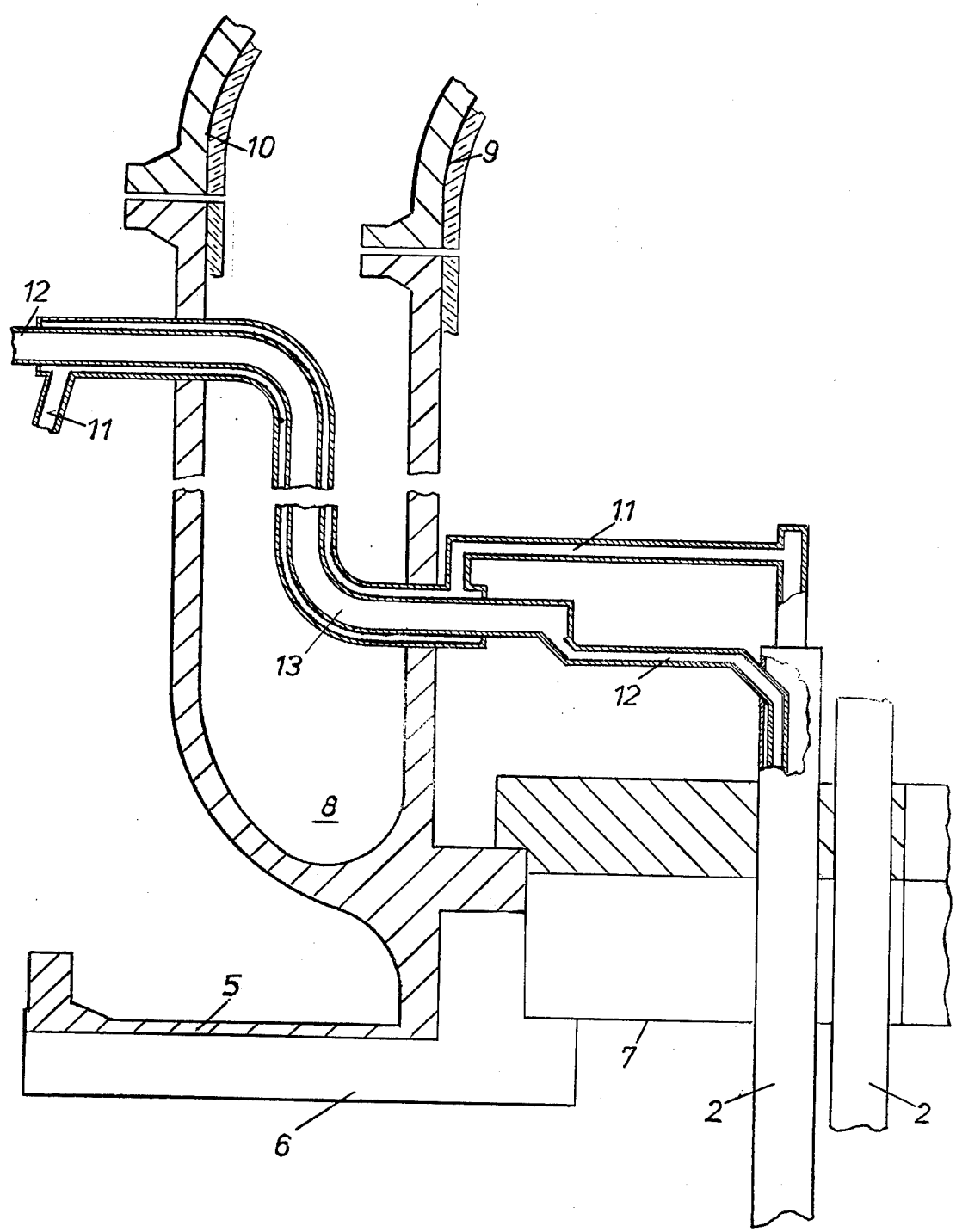

FIG. II is an enlarged fragmentary sectional view of the top of the reaction vessel.

DESCRIPTION OF THE PREFERRED EMBODIMENTS

In a vertically disposed reaction vessel 1 of FIG. I, reaction tubes 2 filled with a suitable catalyst are installed vertically. The heated helium enters a heating space 4 through a nozzle 3, thus providing the heat required for the endothermic reaction. The helium reduced in its temperature leaves the reaction vessel via an outlet nozzle 5. The surfaces of the vessel that come into contact with the heated helium are provided with a thermal insulation 6 to protect them from the excessive heat loads. The vessel has a double wall above a thermal insulation cover 7, thus forming an annular space 8. The vessel 1 has a closed bottom and the top is closed by means of covers 9 and 10. Hydrocarbons and steam are fed to the reaction tubes 2 through an inlet pipe 11 and the product leaves through an outlet pipe 12.

In the example shown, the inlet and outlet pipes 11 and 12 are shown as a coaxial pipe 13. The coaxial pipe 13 can pass through the inner and outer walls either directly, or, as is shown in the drawing, have its point of exit offset in serpentine fashion. If this offsetting of the exit point necessitates a considerable lengthening of the coaxial pipe, then an additional heat exchange effect is obtained.

If it is necessary to remove one or more reaction tubes 2, then the inlet and outlet pipes 13 that are inside the reaction vessel 1 are cut off from the reaction tubes 2 and the latter are withdrawn individually. Prior removal of the covers 9 and 10 poses no particular problem. A clean sealing gas can be introduced into the upper part of the reaction vessel and into the annular space 8 via nozzles 14 and 15, thus preventing a possible flange leakage or the escape of helium gas that may be contaminated. If it is intended to cool the upper part of the reaction vessel, sealing gas outlets are provided through which the heated sealing gas can be withdrawn. An inner thermal insulation is provided for the upper, double-walled top of the reaction vessel and for both covers as protection against excessive heat loads.

What we claim is:

1. A reaction vessel heated by helium under pressure comprising
   a. an upright container having an upper part and a lower part constituting an inside insulated heating space,
   b. vertically spaced inlet and outlet openings in said lower part for ingress and egress of heated helium under pressure,
   c. spaced thermally insulated double walls for said upper part providing an insulating space therebetween,
   d. separate thermally insulated inner and outer covers for said spaced double walls respectively,
   e. a closure for the upper end of said lower container part,
   f. reaction tube heads in said upper part for the feed and for the product of catalytic reaction passing vertically through said closure into said inside insulated heating space, and
   g. inlet and outlet pipes in pairs arranged coaxially, the inlet pipe being the external pipe and extending from the reaction tube heads through the inner wall in gas-tight relationship to said upper reactor part through the space between said walls and thence to the outside through the outer wall in gas-tight relationship to said upper part below said covers for said spaced double walls.

2. A reaction vessel as claimed in claim 1, characterized in that the inlet and outlet pipes for the reactor tubes are disposed in serpentine fashion.

* * * * *